US011761783B2

(12) United States Patent
Doemling et al.

(10) Patent No.: US 11,761,783 B2
(45) Date of Patent: Sep. 19, 2023

(54) METHOD, DEVICE AND SYSTEM FOR DISPLAYING AUGMENTED REALITY NAVIGATION INFORMATION

(71) Applicant: Bayerische Motoren Werke Aktiengesellschaft, Munich (DE)

(72) Inventors: Maximilian Doemling, Shanghai (CN); Tomas Xu, Shanghai (CN)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 447 days.

(21) Appl. No.: 16/955,871

(22) PCT Filed: Dec. 21, 2017

(86) PCT No.: PCT/CN2017/117792
§ 371 (c)(1),
(2) Date: Jun. 19, 2020

(87) PCT Pub. No.: WO2019/119359
PCT Pub. Date: Jun. 27, 2019

(65) Prior Publication Data
US 2020/0393269 A1 Dec. 17, 2020

(51) Int. Cl.
*G01C 21/36* (2006.01)
*G06T 7/73* (2017.01)
(Continued)

(52) U.S. Cl.
CPC ..... *G01C 21/3658* (2013.01); *G01C 21/3602* (2013.01); *G06T 7/74* (2017.01);
(Continued)

(58) Field of Classification Search
CPC ............ G01C 21/3658; G01C 21/3602; G01C 21/3647; G06T 7/74; G06T 11/203;
(Continued)

(56) References Cited

U.S. PATENT DOCUMENTS

2011/0103651 A1 5/2011 Nowak et al.
2011/0301813 A1* 12/2011 Sun ................ B62D 15/029
348/148

(Continued)

FOREIGN PATENT DOCUMENTS

CN 102889892 A 1/2013
CN 103105174 A 5/2013
(Continued)

OTHER PUBLICATIONS

Robert Ferris, "Alibaba-backed augmented reality start-up makes driving look like a video game", posted on CNBC, Nov. 28, 2017. https://www.cnbc.com/2017/11/28/wayray-uses-augmented-reality-to-turn-driving-into-a-video-game.html (Year: 2017).*
(Continued)

*Primary Examiner* — Chong Wu
(74) *Attorney, Agent, or Firm* — Crowell & Moring LLP

(57) ABSTRACT

A method for displaying lane information for a vehicle, includes obtaining a digital map; defining localization information of the vehicle; obtaining a route plan of the vehicle; determining a driving lane according to the localization information of the vehicle and the route plan of the vehicle; obtaining coordinates information of lane markings of the driving lane from the digital map; receiving image data from a camera mounted on the vehicle; transforming the lane markings of the driving lane from a coordinate system of the digital map to a coordinate system of the camera; generating a lane guide sign indicating the lane markings of the driving lane in the coordinate system of the camera based on the lane markings of the driving lane transformed to the coordinate system of the camera; and superimposing the lane guide sign of the lane markings of the driving lane on the image data received from the camera.

13 Claims, 3 Drawing Sheets

(51) Int. Cl.
*G06T 11/20* (2006.01)
*H04N 5/272* (2006.01)

(52) U.S. Cl.
CPC ........... *G06T 11/203* (2013.01); *H04N 5/272* (2013.01); *G06T 2207/30244* (2013.01); *G06T 2207/30256* (2013.01); *G06T 2210/62* (2013.01)

(58) Field of Classification Search
CPC . G06T 2207/30244; G06T 2207/30256; G06T 2210/62; G06T 19/006; H04N 5/272; B60R 2300/304; B60R 2300/308; B60R 2300/804; B60R 1/00
See application file for complete search history.

(56) References Cited

U.S. PATENT DOCUMENTS

2017/0343374 A1 11/2017 Yi et al.
2017/0350720 A1 12/2017 Turner
2020/0041284 A1 2/2020 Liu et al.

FOREIGN PATENT DOCUMENTS

| CN | 106092114 A | 11/2016 |
| CN | 106092121 A | 11/2016 |
| CN | 106767914 A | 5/2017 |
| CN | 106919915 A | 7/2017 |
| KR | 10-2016-0063871 A | 6/2016 |

OTHER PUBLICATIONS

International Search Report (PCT/ISA/210) issued in PCT Application No. PCT/CN2017/117792 dated Sep. 7, 2018 (four pages).
Written Opinion (PCT/ISA/237) issued in PCT Application No. PCT/CN2017/117792 dated Sep. 7, 2018 (four pages).
Extended European Search Report issued in European Application No. 17935139.0 dated Jun. 14, 2021 (seven (7) pages).

* cited by examiner

METHOD, DEVICE AND SYSTEM FOR DISPLAYING AUGMENTED REALITY NAVIGATION INFORMATION

FIELD OF THE INVENTION

The present invention relates in general to the field of augmented reality navigation systems, and in more particular, to a method and an apparatus for displaying lane information, particularly in vehicle.

BACKGROUND

A conventional navigation apparatus displays the current position of a vehicle which is determined by a vehicle position determining unit on a digital map (simply referred to as a "map" from here on) displayed on a display unit while superimposing the current position on the map. Furthermore, the conventional navigation apparatus searches for a recommended route from the current position of the vehicle which is determined by the vehicle position determining unit to a destination inputted via an input unit, and displays the recommended route on the map. The conventional navigation apparatus then carries out a route guidance of the recommended route on the basis of the shapes of road links read from a recording medium.

The existing technology normally combines low precision map with sensor data for navigation system. KR20160063871A discloses an augmented reality navigation apparatus to provide a route guide method which overlaps a direction sign including a route indication direction with a real road image, and displays the overlapped image on a screen. The apparatus captures an image in front of a vehicle, analyzes the image to recognize the lane of the road on which the vehicle is driven, and calculates directions and distances of links included in the route. Then, a direction guide sign indicating a driving direction will be generated. The generated direction guide sign is overlaid with the image to display the generated direction guide sign on the image on the screen.

However, such a system can merely indicate the driving direction of the route rather than detailed information of the driving lane. It cannot show which lane on the road is the right one that the drive should choose. In other words, the existing technology cannot tell the driver where the driving lane is.

Another problem is that the road information gathered by such systems is incomplete and unprecise as a result of unpreventable errors of sensors. The navigation systems using low precision map cannot provide precise enough information.

With the development of augmented reality, the demand of augmented navigation with high resolution information is raised recently. The task of the present invention is to provide a method and a device that can indicate precise information of the driving lane by using augmented reality. The precise lane information includes not only the right lane on the road, but also lane geometry with precise lane boundaries, lane traversal information, lane types, lane marking types and lane level speed limit information.

SUMMARY

Embodiments of the present invention provide a method, a device and a system for displaying lane information for a vehicle, which enable an efficient and comfortable user experience by indicating precise information of the driving lane, e.g. which lane on the road is the right one, using augmented reality technology.

Accordingly, a computer-implemented method for displaying lane information for a vehicle is provided. The method comprises obtaining a digital map; defining localization information of the vehicle; obtaining a route plan of the vehicle; determining a driving lane according to the localization information of the vehicle and the route plan of the vehicle; obtaining coordinates information of lane markings of the driving lane from the digital map; receiving image data from a camera mounted on the vehicle; transforming the lane markings of the driving lane from a coordinate system of the digital map to a coordinate system of the camera; generating an illustration indicating the lane markings of the driving lane in the coordinate system of the camera based on the lane markings of the driving lane transformed to the coordinate system of the camera; superimposing the illustration of the lane markings of the driving lane on the image data received from the camera.

Firstly, the car, especially the in-car navigation system, comprises the digital map and received localization of the car from localization module, e.g. GPS. A High Definition (HD) Map provides a highly accurate and realistic representation of the roadway profile, including curvature and terrain information. The HD Map extends the range of view for the vehicle while enabling smoother, safer and more efficient driving scenarios. The HD Map can also be leveraged to fulfill a broad range of advanced driving applications. The precise lane information includes: lane geometry with precise lane boundaries, lane traversal information, lane types, lane marking types and lane level speed limit information. After calculating the route plan according to the destination of the car, the in-car navigation system can determine the driving lane to be chosen. The navigation system according to the invention obtains and then transforms the coordinates of lane markings of the driving lane from the coordinate system of the HD-map to that of the camera mounted on the car. After generating a lane guide sign indicating the lane markings of the driving lane in the coordinate system of the camera based on the lane markings of the driving lane transformed to the coordinate system of the camera, the navigation system superimposes/overlays the lane guide sign on the image data received from the camera.

Advantageously, the navigation system can show which lane the driver shall choose as well as lane geometry with precise lane boundaries, lane types, lane marking types, the width of the lane and lane level speed limit information.

In a possible implementation manner, the digital map comprises coordinate information of lane markings on roads in the digital map.

In a possible implementation manner, the route plan can be calculated by using the digital map, the localization information of the vehicle and a destination of the vehicle.

In a possible implementation manner, the step "transforming the lane markings of the driving lane from a coordinate system of the digital map to a coordinate system of the camera" comprises:

transforming the lane markings using formula:

$$p_c = T_c^{-1} T_e^{-1} p_w,$$

wherein $p_c$ is a pixel position on the image data of the camera, $T_e$ defines a posture of the vehicle in a coordinate system of the digital map, $T_c$ defines a posture of the camera in a coordinate system of the vehicle, $p_w$ is coordinates information of lane markings of the driving lane.

In a possible implementation manner, $T_e$ is calculated using:

$$T_e = \begin{bmatrix} R_e & p_e \\ 0 & 1 \end{bmatrix},$$

where $R_e$ is the rotation matrix of the vehicle with respect to the digital map, and $p_e$ is the position of the vehicle in the coordinate system of the digital map.

In a possible implementation manner, the lane guide sign indicating the lane markings of the driving lane comprises: lines representing the lane markings, and/or a highlighted area in-between two lane markings of the driving lane.

In a possible implementation manner, the step "superimposing the lane guide sign of the lane markings of the driving lane on the image data received from the camera" comprises:
projecting a semi-transparent guide sign of the lane markings onto the image data received from the camera.

Since the lane guide sign can highlight the lane and show precise lane boundaries of the lane, the navigation system according to the invention can help the driver to recognize the lane in the night and even if the markings of the lane are blurred.

According to a further aspect, a device for displaying lane information for a vehicle is provided. Said device comprises:
a map obtaining module configured to obtain a digital map;
a localization module configured to define localization information of the vehicle;
a route plan module configured to obtain a route plan of the vehicle;
a driving lane module configured to determine a driving lane according to the localization information of the vehicle and the route plan of the vehicle;
a lane marking module configured to obtain coordinates information of lane markings of the driving lane from the digital map;
an image data module configured to receive image data from a camera mounted on the vehicle;
a transformation module configured to transform the lane markings of the driving lane from a coordinate system of the digital map to a coordinate system of the camera;
a lane guide sign module configured to generate a lane guide sign indicating the lane markings of the driving lane in the coordinate system of the camera based on the lane markings of the driving lane transformed to the coordinate system of the camera;
a superimposing module configured to superimpose the lane guide sign of the lane markings of the driving lane on the image data received from the camera.

In a possible implementation manner, the digital map comprises coordinate information of lane markings on roads in the digital map.

In a possible implementation manner, transformation module is configured to transform the lane markings using formula:

$$p_c = T_c^{-1} T_e^{-1} p_w,$$

wherein $p_c$ is a pixel position on the image data of the camera, $T_e$ defines a posture of the vehicle in a coordinate system of the digital map, $T_c$ defines a posture of the camera in a coordinate system of the vehicle, $p_w$ is coordinates information of lane markings of the driving lane.

In a possible implementation manner, $T_e$ is calculated using:

$$T_e = \begin{bmatrix} R_e & p_e \\ 0 & 1 \end{bmatrix},$$

where $R_e$ is the rotation matrix of the vehicle with respect to the digital map, and $p_e$ is the position of the vehicle in the coordinate system of the digital map.

In a possible implementation manner, the lane guide sign indicating the lane markings of the driving lane comprises: lines representing the lane markings, and/or a highlighted area in-between two lane markings of the driving lane.

In a possible implementation manner, the superimposing module is configured to project a semi-transparent guide sign of the lane markings onto the image data received from the camera.

According to a further aspect, the present invention provides a system for displaying lane information for a vehicle, comprising: a above mentioned device for displaying navigation information, a storage medium comprising a digital map, a localization device configured to providing localization information of the vehicle, and a camera configured to sense the environment of the vehicle and output image data of the environment.

According to a further aspect, the present invention also provides a vehicle comprising the above mentioned system.

Advantageously, the navigation system can show which lane the driver shall choose as well as lane geometry with precise lane boundaries, lane types, lane marking types, the width of the lane and lane level speed limit information. In addition, since the lane guide sign can highlight the lane and show precise lane boundaries of the lane, the navigation system according to the invention can help the driver to recognize the lane in the night and even if the markings of the lane are blurred.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

Figure 1:
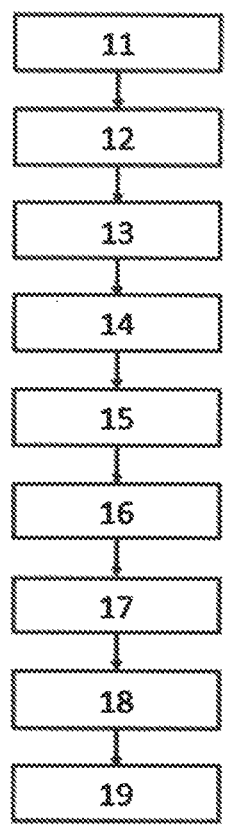
FIG. 1 is a schematic diagram of an embodiment of the method according to the present invention.

FIG. 1 shows a schematic flow chart diagram of an embodiment of the method 10 for displaying lane information for a vehicle, especially for displaying a lane guide sign indicating precise lane boundaries and the width of the lane. The method can be implemented by a data processing device 50 shown in FIG. 2, e.g. a processor with corresponding computer program.

Firstly, the car, especially the in-car navigation system, obtains 11 the digital map and receives 12 localization of the car from localization module, e.g. GPS. A High Definition (HD) Map provides a highly accurate and realistic representation of the roadway profile, including curvature and terrain information. The HD Map extends the range of view for the vehicle while enabling smoother, safer and more efficient driving scenarios. The digital map comprises coordinate information of lane markings on roads in the digital map. The HD Map can also be leveraged to fulfill a broad range of advanced driving applications. The precise lane information includes: lane geometry with precise lane boundaries, lane traversal information, lane types, lane marking types and lane level speed limit information.

After calculating 13 the route plan according to the destination of the car, the in-car navigation system can determine 14 the driving lane to be chosen. Normally, the route plan can be calculated by using the digital map, the localization information of the vehicle and a destination of the vehicle.

The vehicle comprises a camera mounted on the vehicle. The camera detects the environment of the vehicle and outputs the detected image date to the navigation system. The navigation system receives 16 image data from the camera. The navigation system according to the invention obtains 15 and then transforms 17 the coordinates of lane markings of the driving lane from the coordinate system of the HD-map to that of the camera mounted on the car.

The lane markings of the driving lane can be transformed from a coordinate system of the digital map to that of the camera using formula:

$$p_c = T_c^{-1} T_e^{-1} p_w,$$

wherein $p_c$ is a pixel position on the image data of the camera, $T_e$ defines a posture of the vehicle in a coordinate system of the digital map, $T_c$ defines a posture of the camera in a coordinate system of the vehicle, $p_w$ is coordinates information of lane markings of the driving lane.

In addition, $T_e$ can be calculated using:

$$T_e = \begin{bmatrix} R_e & p_e \\ 0 & 1 \end{bmatrix},$$

where $R_e$ is the rotation matrix of the vehicle with respect to the digital map, and $p_e$ is the position of the vehicle in the coordinate system of the digital map.

Comparisons will be made between HD map information and sensor data of surroundings so that posture (position and orientation) of HAD car on HD map can be calculated. Here we define the posture of the car can be represented as transformation matrix $T_e$. Coordinates of Camera in HAD car frame and HAD car's position in HD map is combined to calculate camera's coordinates in HD map. Using sensor calibration techniques, the transformation matrix from the camera coordinate system to the ego vehicle coordinate system $T_c$ can be obtained. In such a way, any 3D coordinate in the map world can be projected to the camera coordinate system.

After generating 18 a lane guide sign indicating the lane markings of the driving lane in the coordinate system of the camera based on the lane markings of the driving lane transformed to the coordinate system of the camera, the navigation system superimposes/overlays 19 the lane guide sign on the image data received from the camera.

HD map information will be loaded in the camera view based on position of camera in HD map. In this way, navigation information including current driving lane, lane change destination can be seen in the external camera's real-time video, since any coordinate in the world can be projected on the image using the formula $p_c$. For a lane, we can represent with a series of points on the lane and project each point onto the image and reconnect them into a lane curve. The road in-between two lane markings can then be highlighted with a half transparent filling color.

The lane guide sign indicating the lane markings of the driving lane can be lines representing the lane markings. Said lines can be fitted by using the data of lane geometry with precise lane boundaries from the digital map. Moreover, the line-shaped lane guide sign can correspond to the lane marking types, e.g. solid line, double line, dot line and so on. In addition, the color of the lane guide sign can correspond the color of the lane marking of the driving lane, e.g. yellow line.

Advantageously, the navigation system indicates to the driver which lane the driver shall choose by showing precise lane boundaries and the width of the lane. In addition, since the lane guide sign can highlight the lane and show precise lane boundaries of the lane, the navigation system according to the invention can help the driver to recognize the lane where the luminance of the road is not enough for recognizing the lane marking, e.g. in the night. Even if the markings of the lane are unclearly printed and blurred, the navigation system can show the driver where the right lane is by illustrating the precise lane boundaries and the width of the lane.

Further information such as lane types, lane marking types, and lane level speed limit information can also be illustrated. Especially, the navigation system can illustrate the line-shaped lane guide sign that corresponds to the lane marking types, e.g. with solid line, double line or dot line and so on. Advantageously, the lane marking types of the lane can also be indicated to the driver in an augmented reality way.

Alternatively, the lane guide sign can be a highlighted area in-between two lane markings of the driving lane.

Furthermore, the lane guide sign projected on the image can be semi-transparent, so that the traffic signs printed on the road can still be seen by the driver.

Figure 2:
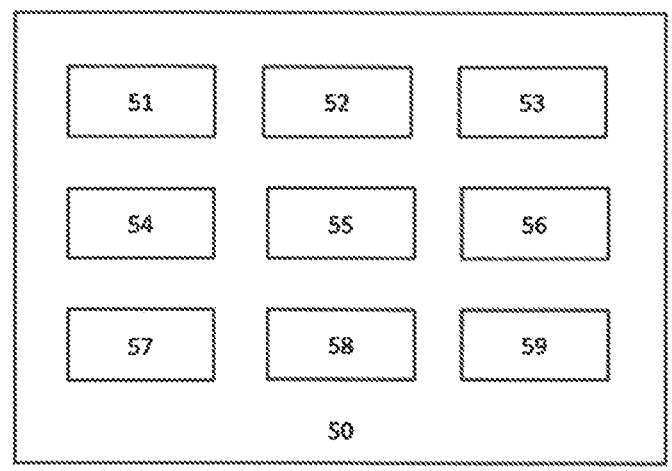
FIG. 2 is a schematic diagram of an embodiment of the device according to the present invention.

FIG. 2 shows a schematic diagram of an embodiment of the device for augmented reality navigation for a vehicle, especially the device 50 for displaying a lane guide sign indicating precise lane boundaries and the width of the lane.

The device 50 for displaying lane information for a vehicle, comprises a map obtaining module 51 configured to obtain a digital map; a localization module 52 configured to define localization information of the vehicle; a route plan module 53 configured to obtain a route plan of the vehicle; a driving lane module 54 configured to determine a driving lane according to the localization information of the vehicle and the route plan of the vehicle; a lane marking module 55 configured to obtain coordinates information of lane markings of the driving lane from the digital map; an image data module 56 configured to receive image data from a camera mounted on the vehicle; a transformation module 57 configured to transform the lane markings of the driving lane from a coordinate system of the digital map to a coordinate system of the camera; a lane guide sign module 58 configured to generate a lane guide sign indicating the lane markings of the driving lane in the coordinate system of the camera based on the lane markings of the driving lane transformed to the coordinate system of the camera; a superimposing module 59 configured to superimpose the lane guide sign of the lane markings of the driving lane on the image data received from the camera.

The navigation system for displaying lane information for a vehicle comprises an above mentioned device for displaying navigation information, a storage medium comprising a digital map, a localization device configured to providing localization information of the vehicle, and a camera configured to sense the environment of the vehicle and output image data of the environment.

Figure 3:
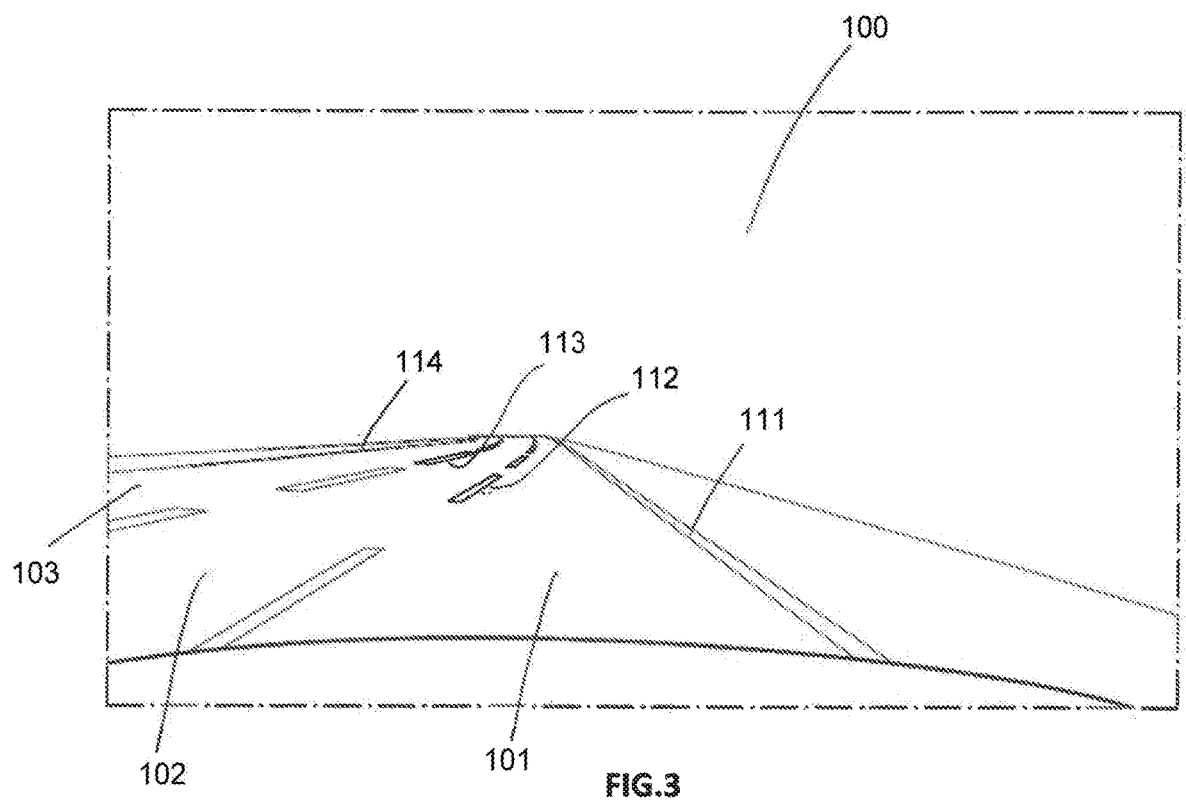
FIG. 3 is a schematic diagram of roads with lanes according to the visual angle of a camera.

FIG. 3 shows a schematic diagram 100 of a street with lanes corresponding to the visual angle of a camera. Accordingly, there are three lanes 101, 102 and 103 and four lane markings 111, 112, 113 and 114.

Road surface marking, e.g. lane marking, is any kind of device or material that is used on a road surface in order to convey official information. They can also be applied in other facilities used by vehicles to mark parking spaces or designate areas for other uses. Road surface markings are used on paved roadways to provide guidance and information to drivers and pedestrians. Road surface markings can be used to delineate traffic lanes, inform motorists and pedestrians. Road surface marking can also indicate regulation for parking and stopping.

A traffic lane or travel lane is a lane for the movement of vehicles traveling from one destination to another, not including shoulders. A through lane or thru lane is a traffic lane for through traffic. At intersections, these may be indicated by arrows on the pavement pointing straight ahead. An express lane of a road is used for faster moving traffic and has less access to exits/off ramps. In other areas, an express lane may refer to a HOV lane (see below). A reversible lane (contraflow lane) is a lane where the direction of traffic can be changed to match the peak flow. They are used to accommodate periods of high traffic flow, especially rush hour where the flow is predominantly in one direction, on roads that cannot be easily widened such as over bridges. One or more lanes are removed from the opposing flow and added to the peak flow.

An auxiliary lane is a lane other than a through lane, used to separate entering, exiting or turning traffic from the through traffic. Dedicated lanes are traffic lanes set aside for particular types of vehicles.

In some areas, the lane adjacent to the curb is reserved for non-moving vehicles. A parking lane is reserved for parallel parking of vehicles. A fire lane is the area next to a curb, which is reserved for firefighting equipment, ambulances, or other emergency vehicles. Parking in these areas, often marked by red lines, usually warrants a parking ticket.

The lane markings are the most important means to identify the different types of lanes.

Figure 4:
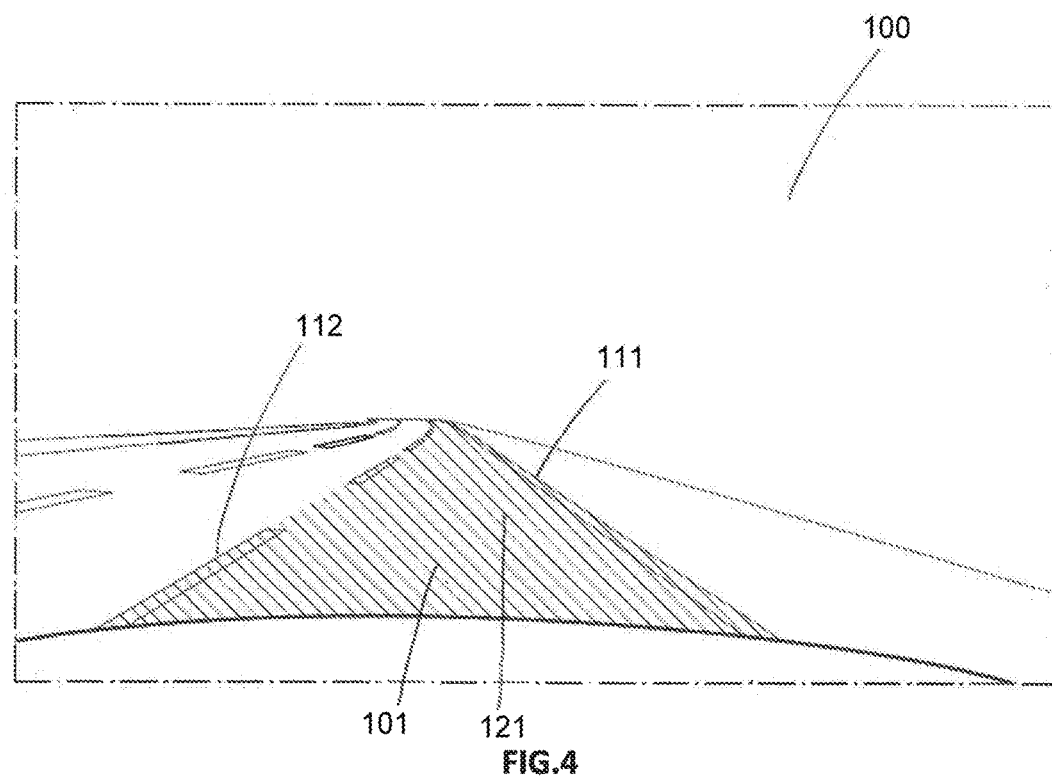
FIG. 4 is a schematic diagram of an example of the lane guide sign of the augmented reality navigation according to the present invention.

FIG. 4 is a schematic diagram of an example of the highlighted lane guidance area using the augmented reality according to the present invention The navigation system shows an overlay layer, i.e. the highlighted lane guidance area 121, on the (moving) image of the reality recorded by the camera. The highlighted lane guidance area 121 exactly corresponds to the position of the lane 101, the precise lane boundaries and the shape of the lane 101, so that the driver knows which lane 101 is chosen by the route plan as well as the position and the width of the lane 101. In addition, the entire area of the lane 101 is highlighted by said highlighted lane guidance area. Therefore, the navigation system according to the invention can help the driver to recognize the lane in a very easy way, even if the road (and the lane markings) is hard to recognize due to different reasons, for example in the night. In addition, the blurred lane markings of the road can be hardly recognized by the human driver, since the life of the overlay-lane markings can merely last between 3 and 8 years. Even if the lane markings have been worn down (to a dangerous level) and are hard to be recognized, based on the highlighted lane guidance area 121 indicated by the navigation system, the driver can still know the position, the precise lane boundaries and the width of the lane. Thus, the navigation system according to the invention also enhances the safety of driving.

The line-shaped lane guide sign corresponds to the types of the lane markings of the driving lane, e.g. solid line, double line or dot line.

Figure 5:
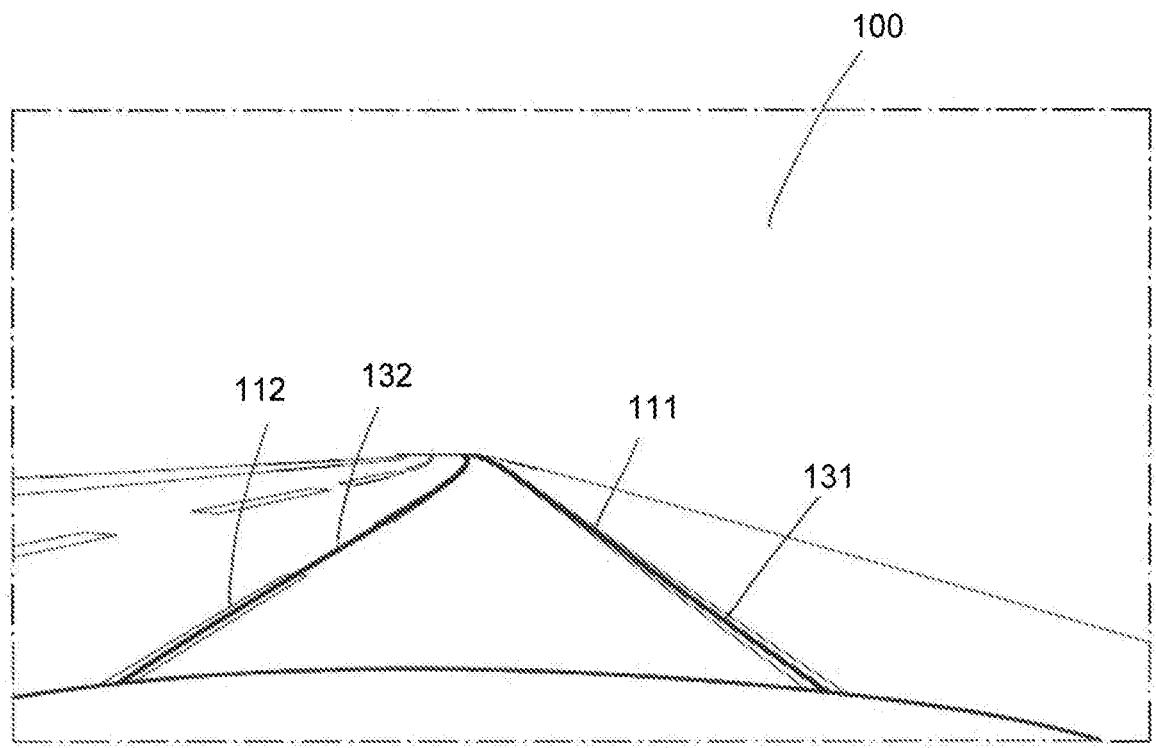
FIG. 5 is a schematic diagram of a further example of the lane guide sign of the augmented reality navigation according to the present invention.

FIG. 5 is a schematic diagram of the lane guidance lines using the augmented reality navigation according to the present invention. The AR navigation system according to the invention shows overlay lines, i.e. the lane guidance lines 131 and 132, on the (moving) image of the reality recorded by the camera. The lane guidance lines 131 and 132 exactly correspond to the position of the lane markings 111 and 112, so that the lane guidance lines 131 and 132 can delineate the precise lane boundaries and the shape of the lane 101, so that the driver knows the position and the width of the lane 101. Shapes and colors of the lane guidance lines 131 and 132 can correspond to the shapes as well as the colors of the real lane markings 111 and 112 on the road.

Figure 6:
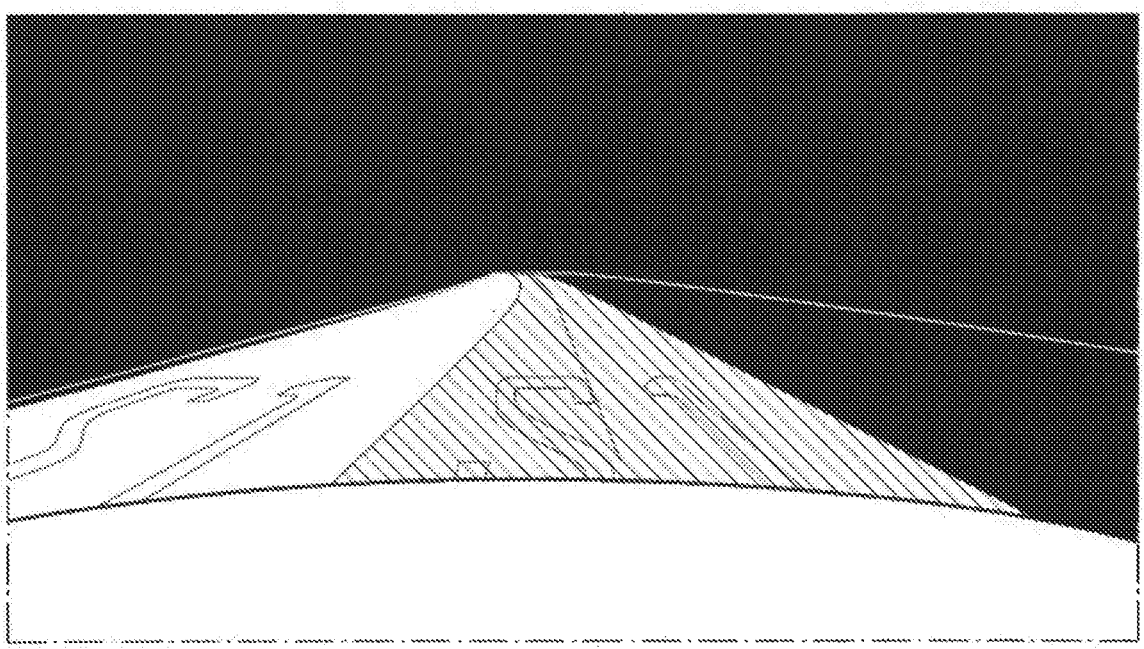
FIG. 6 is a schematic diagram of a further example of the lane guide sign of the augmented reality navigation according to the present invention.

FIG. 6 is a schematic diagram of a further example of the lane guide sign using the augmented reality navigation in a dark environment, e.g. in the night. The highlighted lane guidance area can help the driver to recognize the lane in a very easy way. Even if the lane markings is hard to be recognized due to weak lights, for example in the night. Based on the highlighted lane guidance area 121 indicated by the navigation system, the driver can still know the position, the precise lane boundaries and the width of the lane. Thus, the navigation system according to the invention also enhance the safety of driving.

Furthermore, the lane guide sign, e.g. the highlighted lane guidance area can be semitransparent, so that the highlighted lane guidance area does not shade or obstruct other road surface markings printed on the road, for example the sign of "S1" shown in FIG. 6. Therefore, the driver can still get aware of the road surface markings so that he can behavior accordingly.

The invention claimed is:

1. A method for displaying lane information for a vehicle, comprising:
   obtaining a digital map;
   defining localization information of the vehicle;
   obtaining a route plan of the vehicle;
   determining a driving lane according to the localization information of the vehicle and the route plan of the vehicle;

obtaining coordinates information of lane markings of the driving lane from the digital map;
receiving image data from a camera mounted on the vehicle;
transforming the lane markings of the driving lane from a coordinate system of the digital map to a coordinate system of the camera;
generating a lane guide sign indicating the lane markings of the driving lane in the coordinate system of the camera based on the lane markings of the driving lane transformed to the coordinate system of the camera; and
superimposing the lane guide sign of the lane markings of the driving lane on the image data received from the camera,
wherein the lane guide sign indicating the lane markings of the driving lane comprises:
lines representing the lane markings, and
a highlighted area in between the lane markings, wherein an entire area of the driving lane is highlighted by the highlighted area, and
wherein the step of transforming the lane markings of the driving lane from the coordinate system of the digital map to the coordinate system of the camera comprises:
transforming the lane markings using formula:

$$p_c = T_c^{-1} T_e^{-1} p_w,$$

wherein $p_c$ is a pixel position on the image data of the camera, $T_e$ defines a posture of the vehicle in a coordinate system of the digital map, $T_c$ defines a posture of the camera in a coordinate system of the vehicle, $p_w$ is coordinates information of lane markings of the driving lane.

2. The method according to claim 1, wherein
the digital map comprises coordinate information of lane markings on roads in the digital map.

3. The method according to claim 1, wherein
the route plan is calculated by using the digital map, the localization information of the vehicle and a destination of the vehicle.

4. The method according to claim 1, wherein $T_e$ is calculated using:

$$T_e = \begin{bmatrix} R_e & p_e \\ 0 & 1 \end{bmatrix},$$

where $R_e$ is the rotation matrix of the vehicle with respect to the digital map, and $p_e$ is the position of the vehicle in the coordinate system of the digital map.

5. The method according claim 1, wherein
a line-shaped lane guide sign corresponds to the lane marking type of the lane markings of the driving lane in a form of a solid line, double line or dot line.

6. The method according to claim 1, wherein the step of superimposing the lane guide sign of the lane markings of the driving lane on the image data received from the camera comprises:
projecting a semi-transparent guide sign of the lane markings onto the image data received from the camera.

7. A device for displaying lane information for a vehicle, comprising a processor comprising:
a map obtaining module configured to obtain a digital map;
a localization module configured to define localization information of the vehicle;
a route plan module configured to obtain a route plan of the vehicle;
a driving lane module configured to determine a driving lane according to the localization information of the vehicle and the route plan of the vehicle;
a lane marking module configured to obtain coordinates information of lane markings of the driving lane from the digital map;
an image data module configured to receive image data from a camera mounted on the vehicle;
a transformation module configured to transform the lane markings of the driving lane from a coordinate system of the digital map to a coordinate system of the camera;
a lane guide sign module configured to generate a lane guide sign indicating the lane markings of the driving lane in the coordinate system of the camera based on the lane markings of the driving lane transformed to the coordinate system of the camera; and
a superimposing module configured to superimpose the lane guide sign of the lane markings of the driving lane on the image data received from the camera,
wherein the lane guide sign indicating the lane markings of the driving lane comprises:
lines representing the lane markings, and
a highlighted area in between the lane markings, wherein an entire area of the driving lane is highlighted by the highlighted area, and
wherein the transformation module is configured to transform the lane markings of the driving lane from the coordinate system of the digital map to the coordinate system of the camera by:
transforming the lane markings using formula:

$$p_c = T_c^{-1} T_e^{-1} p_w,$$

wherein $p_c$ is a pixel position on the image data of the camera, $T_e$ defines a posture of the vehicle in a coordinate system of the digital map, $T_c$ defines a posture of the camera in a coordinate system of the vehicle, $p_w$ is coordinates information of lane markings of the driving lane.

8. The device according to claim 7, wherein
the digital map comprises coordinate information of lane markings on roads in the digital map.

9. The device according to claim 7, wherein $T_e$ is calculated using:

$$T_e = \begin{bmatrix} R_e & p_e \\ 0 & 1 \end{bmatrix},$$

where $R_e$ is the rotation matrix of the vehicle with respect to the digital map, and $p_e$ is the position of the vehicle in the coordinate system of the digital map.

10. The device according to claim 7, wherein a line-shaped lane guide sign corresponds to the lane marking type of the lane markings of the driving lane in a form of a solid line, double line or dot line.

11. The device according to claim 7, wherein
the superimposing module is configured to project a semi-transparent guide sign of the lane markings onto the image data received from the camera.

12. A system for displaying lane information for a vehicle, comprising:
a device for displaying navigation information according to claim 7,
a storage medium comprising a digital map;

a localization device configured to providing localization information of the vehicle; and a camera configured to sense the environment of the vehicle and output image data of the environment.

13. A vehicle comprising a system according to claim 12.

* * * * *